United States Patent [19]

Bae et al.

[11] Patent Number: 5,102,933

[45] Date of Patent: Apr. 7, 1992

[54] POLYVINYLCHLORIDE COMPOSITION AND STABILIZERS THEREFOR

[75] Inventors: Kook-Jin Bae, East Northport; Stuart D. Brilliant, Levittown, both of N.Y.

[73] Assignee: Witco Corporation, New York, N.Y.

[21] Appl. No.: 526,833

[22] Filed: May 22, 1990

[51] Int. Cl.⁵ ............................ C08K 5/521; C08K 5/09
[52] U.S. Cl. ............................ 524/147; 524/151; 524/387; 524/388; 524/396; 524/397; 252/400.61; 252/407
[58] Field of Search ............................ 252/407, 400.61; 524/357, 387, 388, 397, 396, 147, 151

[56] References Cited

U.S. PATENT DOCUMENTS

| | | | |
|---|---|---|---|
| 3,396,132 | 8/1968 | Perry et al. | 524/387 |
| 4,102,839 | 7/1978 | Crochemore et al. | 524/357 |
| 4,123,399 | 10/1978 | Gay | 524/357 |
| 4,221,687 | 9/1980 | Minagawa et al. | 524/357 |
| 4,244,848 | 1/1981 | Minagawa et al. | 524/357 |

*Primary Examiner*—Veronica P. Hoke
*Attorney, Agent, or Firm*—Lockwood, Alex, FitzGibbon & Cummings

[57] ABSTRACT

A composition useful for the thermal stabilization of polyvinylchloride resin comprising an alkyl and aryl-substituted beta-diketone, mannitol and a mixture of magnesium and zinc salts of benzoic and fatty aliphatic acids is disclosed. Also disclosed is polyvinylchloride resin effectively stabilized with the stabilizer composition and a method for effectively stabilizing polyvinylchloride from discoloration at elevated temperatures.

20 Claims, No Drawings

POLYVINYLCHLORIDE COMPOSITION AND STABILIZERS THEREFOR

BACKGROUND OF THE INVENTION

This invention relates to the thermal stabilization of polyvinylchloride. In particular this invention relates to compositions capable of providing important thermal stability to food grade polyvinylchloride. An important aspect of this invention is a thermal stabilizer composition not containing tin and capable of protecting food grade polyvinylchloride from discoloration when exposed to temperatures of at least about 450o F. during processing into articles such as tamper evident closures.

In recent years a number of patents have issued showing how to stabilize polyvinylchloride resins using organotin compounds. Among these patents are U.S. Pat. No. 3,803,083, issued Apr. 9, 1974 to Brecker; U.S. Pat. No. 3,887,519, issued June 3, 1975 to Weisfeld; U.S. Pat. No. 4,255,320 issued Mar. 10, 1981 to Brecker; and U.S. Pat. No. 4,839,992, issued May 30, 1989 to Larkin. Organotin compounds, because of their unusual heat stabilizing properties, have now set a standard for heat stability which remains unequaled. However, the organotin compounds have the disadvantage that they are odorous, and this limits their use to applications where odor is not a problem.

Solutions to the problem of the heat instability of polyvinylchloride resins which do not use tin-containing compounds have also been disclosed in the literature.

Crochemore and Gay, U.S. Pat. No. 4,102,839, propose compositions for stabilizing vinyl chloride polymers against thermodegradation composed of a divalent metal salt of an aliphatic or organic carboxylic acid, in combination with a dicarbonyl compound such as a beta-diketone or a beta-ketoaldehyde.

Gay U.S. Pat. No. 4,123,399 discloses thermal stabilizer compositions containing a pair of organic acid salts of calcium and zinc, a polyol, and a beta-diketone of like formula to U.S. Pat. No. 4,102,839. The working Examples of the Gay patent also demonstrate the important contribution of the beta-diketone to heat stability during high temperature processing of the polymer chloride resin composition.

Gay U.S. Pat. No. 4,123,400 discloses thermal stabilizer compositions similar to the disclosure in his U.S. Pat. No. 4,123,400 except that the organic acid salts are pairs of the following metals: Ca-Zn, Ca-Cd, Ba-Zn or Ba-Cd.

Minagawa, Sekiguchi and Nakazawa U.S. Pat. No. 4,221,687 provides anti-yellowing additives for environmentally acceptable stabilized vinyl chloride polymer compositions from which arsenic, cadmium, lead, mercury and thallium are substantially excluded, comprising at least one basic inorganic compound of lithium, sodium, potassium, magnesium, calcium, strontium, barium, zinc, titanium, aluminum, zirconium or tin, and a 1,3-diketone compound.

Minagawa, Sekiguchi and Nakazawa U.S. Pat. No. 4,244,848 provides environmentally acceptable stabilizer compositions for enhancing the resistance to deterioration upon heating at 175° C. of a vinyl chloride polymer from which lead, cadmium, mercury, thallium and arsenic are substantially excluded, comprising at least one zinc, alkali metal or alkaline earth metal organic phosphate ester salt and at least one beta-diketone compound having from 5 to about 30 carbon atoms, which is a cyclic or open chain beta-diketone, or a zinc, alkali metal or alkaline earth metal salt thereof.

These stabilizer compositions are used to impart heat resistance to the polyvinylchloride polymer at the high temperatures of at least about 350° F. incurred during the manufacture of various shaped articles by molding, extrusion and plastic processes. These processes require high temperatures in order to bring the polymer to a sufficiently soft state, and the degradation of the polyvinylchloride resin occurs at these processing temperatures.

It is therefore an object of the present invention to provide compositions useful for the stabilization of polyvinylchloride resin from degradation caused by high temperatures.

Another object of the present invention is a food grade polyvinylchloride resin composition not discolored by temperatures incurred during processing.

Another object of the present invention is a useful polyvinylchloride resin thermal stabilizer that does not contain tin.

Still another object of the present invention are methods for preventing the discoloration of polyvinylchloride during its processing into objects used in contact with food.

Other objects will become apparent from the ensuing description.

SUMMARY OF THE INVENTION

The stabilizer compositions of the present invention comprise: 1) a beta-diketone having aliphatic and aromatic substituents, 2) mannitol and 3) a mixture of magnesium and zinc salts of benzoic acid and fatty aliphatic acids. The stabilizer compositions when added to polyvinylchloride resin provide food grade polyvinylchloride resin compositions stable at the temperatures encountered during the normal processing of said resins into useful objects. Other components normally present in polyvinylchloride resin compositions can also be present in the compositions of this invention.

DETAILED DESCRIPTION OF THE INVENTION

In particular the instant stabilizer compositions comprise: 1) a beta-diketone having the structural formula:

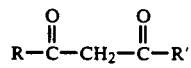

wherein R is alkyl having at least about 10 carbon atoms and R' is phenyl or phenyl substituted up to about 3 lower alkyl groups.

Exemplary of beta-diketones useful in the stabilizer compositions of the present invention are lauroylbenzoylmethane, myristoylbenzoylmethane, palmitoyl benzoyl methane, stearoyl benzoyl methane, octadecanoyl benzoyl methane, tetradecanoyl benzoylmethane, lauroyl toluylmethane, stearoyltoluylmethane, lauroylxyloylmethane, stearoylxyloylmethane, and the like.

For most purposes, the R group need not have more than about 30 carbon atoms, preferably no more than 20 carbon atoms. A preferred di-beta ketone for use in the stabilizer composition of the present invention is stearoylbenzoylmethane.

A second component of the present stabilizer compositions is mannitol. As with the other components of the present stabilizer composition, the amount of mannitol will depend on various factors including, but not limited to, the processing temperatures to which the polyvinylchloride will be exposed, the identity and amounts of modifiers in the polyvinylchloride, the grade of polyvinylchloride resin and other like factors. Generally, the mannitol should be present in an amount of between about 50 weight percent to about 200 weight percent of the beta-diketone content. Larger or lesser amounts may be useful for certain purposes.

A third component of the present stabilizer composition is a mixture of magnesium and zinc salts of benzoic acid and fatty aliphatic acids. This mixture can be obtained by various procedures known in the art. One convenient procedure is to add together at least one fatty aliphatic acid, at least one benzoic acid, zinc oxide and magnesium oxide in a convenient order and heat the mixture until reacted. This in situ preparation will result in a mixture useful in the present compositions containing magnesium, zinc, benzoate and carboxylate moieties.

As an alternative procedure the mixture of magnesium and zinc benzoates and carboxylates can also be prepared by mixing the individual salts by known procedures. Thus for example magnesium stearate and zinc benzoate, or magnesium benzoate and zinc stearate can be blended in a suitable vessel and mixed to prepare this component. Other procedures can also be used for the preparation of this component of the present stabilizer compositions without departing from the scope of this invention.

In general the fatty aliphatic acids useful in this component of the present compositions have at least about 10 carbon atoms. For many uses, stearates are a preferred carboxylate moieties for this component of the present invention.

As with the content of mannitol, the amount of the mixture of magnesium and zinc benzoate and carboxylates in the present stabilizer compositions will depend on the factors stated for the mannitol content. For most purposes, the mixture of magnesium and zinc benzoates and carboxylates can be between about 25 and 400 weight percent of the content of beta-diketone. Larger or lesser amounts may be useful for certain purposes.

The compositions according to the invention destined for working into rigid shaped articles generally comprise modifiers to increase impact strength, and, optionally, pigments, fillers, lubricants, and the like, in addition to the polymer and the noted stabilizers. Antioxidants, light stabilizers and/or UV stabilizers can also be added to the subject compositions.

The actual formulation of the compositions according to the invention can be effected in accordance with any known process. The various stabilizers can be admixed with the plasticizer, when present, either individually or after having themselves been mixed with each other, and can thence be incorporated into the polymer. Any and all of the typical methods known to this art are well suited for formulating any given mixture of the individual ingredients. Nevertheless, the homogenization of any composition according to the invention is advantageously carried out by means of a malaxator or a roll mixer, and any such procedure is advantageously conducted at a temperature such that the mass is fluid, which facilitates mixing. This temperature can be, for example, on the order of 100° C.

The compositions of the present invention may contain additional ingredients including epoxies such as epoxidized soybean oil or epoxidized linseed oil; an organic phosphite, an antioxidant, a light stabilizer, a UV stabilizer, a lubricant, an impact strength modifier, a pigment, a filler, an organotin mercaptide, a plasticizer, and admixtures thereof. Such additives are conventionally employed in resin compositions and are readily recognized by those of skill in the art.

In addition the compositions of the present invention can also contain additional light and heat stabilizers. Organophosphite compounds are particularly useful heat and light stabilizers. Such phosphite stabilizers normally contain alkyl or aryl radicals in sufficient numbers to satisfy the three valences of the phosphite. Exemplary of useful phosphites are isopropylidene phenol $C_{12}$-$C_{15}$ alkyl phosphites, spiro-bisphosphites, dialkyl pentaerythritol diphosphites, triisodecyl phosphite, tris-stearyl phosphite, triphenyl phosphite, nonylphenyl phosphite, tris-(2-t-butyl-4-methyl-phenyl) phosphite and triisodecyl phosphite, and bis(2,4-di-t-butylphenyl) pentaerythritol diphosphite.

The compositions themselves can be processed in accordance with conventional techniques normally employed for processing the state of the art PVC compositions, for example, by extrusion, by injection, by calendaring, by molding, by rotational molding, by such molding or by deposition on a carrier or support which may or may not be provided with a release surface, or by extrusion.

In order to determine the effectiveness of the compositions of this invention in preventing the deterioration, especially the discoloration of polyvinylchloride resin from the effects of elevated temperatures often encountered during the processing of polyvinylchloride resin compositions by extrusion and other methods into useful objects, a series of stabilizer formulations were prepared blended into the polyvinylchloride resin on a mill to form sheets and the sheets subjected to elevated temperatures (350° F. and 450° F.).

The stabilized polyvinylchloride resin sheets were maintained at 350° F. to 2 hours and inspected visually for color at 15 minute intervals by removing a sample thereof from the sheet of polyvinylchloride resin. Correspondingly stabilized polyvinylchloride sheets were also maintained at 450° F. for 18 minutes, sampled at 2 or 3 minute intervals and visually inspected for color.

In all of this testing a tin stabilizer, a dimethyltin, mono-methyltin isooctylthioglycolate was used as a control. This compound is a commercial product.

The formulations in the following Examples tested include stabilizer compositions within the scope of the present invention and stabilizer compositions disclosed in the literature. Example 1 was performed with a stabilizer composition of the present invention; Example 2 compares the stabilizer composition of the present invention with compositions not containing all of the components of the present invention; and Example 3 was performed with stabilizer compositions outside the scope of the present stabilizer compositions. (In the following formulations, the amounts of each component in the stabilizer formulations and in the polyvinylchloride resin blend are in parts by weight).

EXAMPLE 1

The following stabilizer formulation was prepared:

| Stabilizer Formulation 1 | |
| --- | --- |
| Zinc stearate | 41 |

-continued

| Stabilizer Formulation 1 | |
|---|---|
| Magnesium benzoate | 25 |
| Mannitol | 31 |
| BHT Antioxidant | 3 |

The following polyvinylchloride resin blend was prepared:

| | |
|---|---|
| Polyvinylchloride resin (GP 2092) | 100 |
| Acrylic impact modifier | 8 |
| Acrylic process acid | 3 |

Heat stability tests were then performed on stabilized polyvinylchloride resin sheets prepared by blending stabilizer formulation and the other components listed below into the polyvinylchloride resin blend on a mill. The polyvinylchloride resin sheets were maintained at temperatures 350° F. and 450° F., respectively. The sheet maintained at 350° F. was sampled at 15 minute intervals and the samples observed visually for color. The sheet maintained at 450° F. was sampled at 2 minute intervals and the samples observed visually for color.

| | Test | | | | | | |
|---|---|---|---|---|---|---|---|
| Components | 1 | 2 | 3 | 4 | 5 | 6 | 7 |
| Stabilizer Formulation 2 | 1.6 | 1.6 | 1.6 | 1.6 | 1.6 | 1.6 | 1.5 |
| Stearoyl Benzoyl Methane | 0.4 | 0.4 | 0.4 | 0.4 | 0.4 | 0.4 | 0.5 |
| Epoxy soybean oil | 3.0 | 3.0 | 5.0 | 10.0 | 1.0 | 5.0 | 5.0 |
| isopropylidene diphenol $C_{12}$-$C_{15}$ alkyl phosphite | — | 0.5 | 0.5 | 0.5 | — | 0.5 | 0.5 |
| 2,6-dimethyl dihydropyridine-3,5-dicarboxylic acid didedocyl ester | — | — | — | — | — | 0.1 | — |

EXAMPLE 2

The following polyvinylchloride resin blend was prepared:

| | |
|---|---|
| Polyvinylchloride resin (GP 2022) | 100 |
| Epoxy soybean oil | 10 |
| Acrylic impact modifier | 8 |
| Acrylic processing acid | 3 |

Heat stability tests were then performed on stabilized polyvinylchloride resin sheets prepared by blending the following stabilizer formulations, wherein Sample A represent the stabilizer composition of the present invention and Samples B-E represent compositions outside the scope of the present invention, into the polyvinylchloride resin blend on a mill.

The polyvinylchloride resin sheets were maintained at temperatures 350° F. and 450° F., respectively. The sheet maintained at 350° F. was sampled at 15 minute intervals and the samples observed visually for color. The sheet maintained at 450° F. was sampled at 2 minute intervals and the samples observed visually for color.

| Composition | A | B | C | D | E |
|---|---|---|---|---|---|
| Zinc stearate | 41 | 41 | 41 | 41 | 41 |
| Magnesium benzoate | 25 | 25 | 25 | 25 | — |

-continued

| Composition | A | B | C | D | E |
|---|---|---|---|---|---|
| Mannitol | 31 | 31 | 31 | — | 31 |
| BHT Anti-oxidant | 3 | 3 | 3 | 3 | 3 |
| Stearoyl benzoyl methane | 17 | 17 | — | 17 | 17 |
| Sorbitol | — | — | — | 31 | — |
| Calcium benzoate | — | — | — | — | 25 |

EXAMPLE 3

The following stabilizer formulations were prepared:

| | Stabilizer Formulation 3(a) | Stabilizer Formulation 3(b) |
|---|---|---|
| Stearoylbenzoyl methane | 17 | 22.5 |
| Calcium stearate | 22 | — |
| Zinc stearate | 29 | 30 |
| Stannous stearate | 7 | — |
| Sorbitol | 22 | — |
| BHT Antioxidant | 3 | 2.5 |
| Pentaerythritol | — | 25 |
| Magnesium benzoate | — | 17.5 |
| 2,6-dimethyl dihydropyridine-3,5-dicarboxylic acid didodecyl ester | — | 2.5 |

The following polyvinylchloride resin blend was prepared:

| | |
|---|---|
| Polyvinylchloride resin (GP 2092) | 100 |
| Epoxy soybean oil (Dr.6.8) | 3 |
| Acrylic impact modifier | 8 |
| Acrylic process acid | 3 |

Heat stability tests were then performed on stabilized polyvinylchloride resin compositions made by blending 2.07 parts by weight of stabilizer formulations 1 and 2, respectively, into the blended polyvinylchloride resin. Additional Dr.6.8 was also added at various weight levels, i.e. 2.0 and 4.0 parts with Formulation 1 and 0, 2.0, 5.0 and 7.0 parts with Formulation 2.

The sheet maintained at 350° F. was sampled at 15 minute intervals and the samples observed visually for color. The sheet maintained at 450° F. was sampled at 3 minute intervals and the samples observed visually for color.

The results of the heat stability testing of the aforedescribed heat stabilizer composition demonstrate that the stabilizer compositions of the present invention are excellent stabilizers limiting the discoloration of polyvinylchloride resin maintained at elevated temperatures.

As can be seen from the foregoing results, the stabilizer compositions of the present invention may be used in stabilizing amounts to inhibit the heat induced degradation of vinyl chloride polymer Typically, these blends may be used in amounts of 0.1 to 10 parts by weight of 100 parts by weight of the vinyl chloride polymer. Preferably these blends may be used in the amount of 0.5 to 3, and more preferably 1.0 to 1.75, parts per 100 parts of vinyl chloride polymer.

The blends of the present invention can also include an antioxidant component that can be any organic compound capable of inhibiting deterioration of organic substances in the presence of oxygen. Preferred antioxidant components are the phenolic antioxidants such as 1,1,3-tris (2-methyl-4-hydroxy-5-t-butylphenyl) butane or 2,6-di-t-butyl-4-methyl phenol. Typically, the phenolic antioxidant component will be used in an amount of 0.1 to 5 parts per weight of the blend of beta-diketone, mannitol and magnesium and zinc benzoates and fatty carboxylates in accordance with this invention. More particularly, the antioxidant is used in an amount of approximately 3% by weight of such blend. Polyvinyl polymers stabilized with blends of the present invention including small percentages of such phenolic antioxidants can inhibit improved heat stability with little or no loss of light stability compared to polyvinyl polymers stabilized with such blends but without the added phenolic antioxidant.

The novel stable compositions of this invention may be formulated by such techniques as milling, dry blending, Banbury blending, or any other commonly employed formulating technique.

While the stabilizer compositions of the present invention can be used to stabilize various grades of vinyl chloride polymer, they are particularly useful in the preparation of food grade polyvinylchloride. While the polyvinylchloride can be used to manufacture a wide variety of articles, it is particularly useful for the manufacturers of tamper evident packaging. The usage requires a thin vinyl chloride polymer in contact with foods which will break if tampered with in the store or elsewhere prior to the ordinary use of the food container.

While in the foregoing specification certain embodiments and example of this invention have been described in detail, it will be apparent that modification and variations therefrom will be apparent to those skilled in this art and that this invention is to be limited only by the scope of the appended claims.

We claim:

1. A composition of matter useful as a thermal stabilizer for polyvinyl chloride resins which comprises an alkyl and aryl-substituted beta-diketone, mannitol in an amount of from about 50 to about 200 weight percent of the beta-diketone and a mixture of magnesium and zinc salts of benzoic and fatty aliphatic acids in an amount of from about 25 to about 400 weight percent of the beta-diketone.

2. A composition of claim 1 wherein the beta-diketone has the following structural formula:

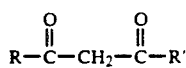

wherein R is alkyl having at least about 10 carbon atoms and R' is phenyl substituted with up to about 3 lower alkyl groups.

3. A composition of claim 2 wherein the beta-diketone is stearoyl benzoyl methane.

4. A composition of matter of claim 1 wherein the fatty aliphatic acids have at least about 10 carbon atoms.

5. A composition of matter of claim 4 wherein at least one aliphatic acid is stearic acid.

6. A composition of claim 4 wherein the mixture of magnesium and zinc salts of benzoic and fatty aliphatic acids is prepared by heating benzoic acid, at least one fatty carboxylic acid, zinc oxide and magnesium oxide.

7. The composition of claim 6 wherein at least one fatty aliphatic acid is stearic acid.

8. A composition of claim 4 wherein the mixture of magnesium and zinc salts of benzoic and fatty aliphatic acids is prepared by mixing magnesium benzoate and a zinc carboxylate.

9. The composition of claim 8 wherein the zinc carboxylate is zinc stearate.

10. A composition of claim 4 wherein the mixture of magnesium and zinc salts of benzoic and fatty aliphatic acids is prepared by mixing zinc benzoate and a magnesium carboxylate.

11. The composition of claim 10 wherein the magnesium carboxylate is magnesium stearate.

12. The composition of claim 4 which also contains a stabilizing amount of an organic phosphite.

13. A polyvinylchloride resin composition which comprises polyvinylchloride resin and a heat stabilizing effective amount of the composition of claim 1.

14. A polyvinylchloride resin composition which comprises polyvinylchloride resin and a heat stabilizing effective amount of the composition of claim 3.

15. A polyvinylchloride resin composition which comprises polyvinylchloride resin and a heat stabilizing effective amount of the composition of claim 5.

16. A method for stabilizing polyvinylchloride resins from deterioration caused by exposure to elevated temperatures which comprises adding a heat stabilizing effective amount of the composition of claim 1 to the polyvinylchloride resin.

17. A method for stabilizing polyvinylchloride resins from deterioration caused by exposure to elevated temperatures which comprises adding a heat stabilizing effective amount of the composition of claim 3 to the polyvinylchloride resin.

18. A method for stabilizing polyvinylchloride resins from deterioration caused by exposure to elevated temperatures which comprises adding a heat stabilizing effective amount of the composition of claim 5 to the polyvinylchloride resin.

19. A method for stabilizing polyvinylchloride resins from deterioration caused by exposure to elevated temperatures which comprises adding a heat stabilizing effective amount of the composition of claim 9 to the polyvinylchloride resin.

20. A method for stabilizing polyvinylchloride resins from deterioration caused by exposure to elevated temperatures which comprises adding a heat stabilizing effective amount of the composition of claim 11 to the polyvinylchloride resin.